United States Patent
Huang et al.

(10) Patent No.: US 9,059,650 B2
(45) Date of Patent: Jun. 16, 2015

(54) ANGLE DETECTING MODULE AND METHOD FOR MOTOR ROTOR

(71) Applicant: RHYMEBUS CORPORATION, Taichung (TW)

(72) Inventors: Ming-Shi Huang, New Taipei (TW); Hung-Hsing Chiang, Kaohsiung (TW); Ming-Chang Chou, Taichung (TW); Cheng-Ching Chang, Taichung (TW)

(73) Assignee: RHYMEBUS CORPORATION, Taichung (TW)

( * ) Notice: Subject to any disclaimer, the term of this patent is extended or adjusted under 35 U.S.C. 154(b) by 54 days.

(21) Appl. No.: 14/145,993

(22) Filed: Jan. 1, 2014

(65) Prior Publication Data

US 2014/0210390 A1  Jul. 31, 2014

(30) Foreign Application Priority Data

Jan. 31, 2013  (TW) ............................. 102103753 A (51) Int. Cl.
*H02P 6/16* (2006.01)

(52) U.S. Cl.
CPC . *H02P 6/165* (2013.01); *H02P 6/16* (2013.01)

(58) Field of Classification Search
CPC ....................................................... H02P 6/165
USPC ................................ 318/400.04, 400.01, 700
See application file for complete search history.

(56) References Cited

U.S. PATENT DOCUMENTS

| | | | |
|---|---|---|---|
| 4,912,378 A | 3/1990 | Vukosavic | |
| 5,001,405 A | 3/1991 | Cassat | |
| 5,739,652 A | 4/1998 | Sriram | |
| 7,391,207 B2 | 6/2008 | Oohira | |
| 7,714,529 B2 * | 5/2010 | Chen et al. | ................... 318/712 |
| 2003/0128026 A1 | 7/2003 | Lutz | |

FOREIGN PATENT DOCUMENTS

| | | |
|---|---|---|
| CN | 101424544 B | 4/2012 |
| TW | 201029313 A | 8/2010 |

OTHER PUBLICATIONS

Jeong-Hoi Gu et al., A new velocity measurement method using linear type Hall-effect sensor for an electro-mechanical fin actuator, SICE, 2007 Annual Conference, Sep. 2007, pp. 2179-2183.

* cited by examiner

*Primary Examiner* — David S Luo
(74) *Attorney, Agent, or Firm* — CKC & Partners Co., Ltd.

(57) ABSTRACT

An angle detecting module for a motor rotor is provided. The angle detecting module includes a permanent-magnet synchronous motor, three linear hall components and a processing device. The permanent-magnet synchronous motor includes a stator and a rotor. The three linear hall components are disposed on the stator; and the linear hall components are spaced by electrical 120 degrees. Each of the linear hall components outputs an analog signal after measuring a magnetic field position of the rotor, and each of the analog signals has magnetically saturated third harmonic component. The processing device is electrically connected to the linear hall components, and the processing device optimizes each of the analog signals and generates an average rotor angle.

28 Claims, 13 Drawing Sheets

Fig. 14

ANGLE DETECTING MODULE AND METHOD FOR MOTOR ROTOR

RELATED APPLICATIONS

The application claims priority to Taiwan Application Serial Number 102103753, filed on Jan. 31, 2013, which is herein incorporated by reference.

BACKGROUND

1. Technical Field

The present disclosure relates to an angle detecting module and an angle detecting method for a permanent-magnet synchronous motor and more particularly, relates to an angle detecting module and an angle detecting method for a permanent-magnet synchronous motor using hall sensors to convert a magnetic flux of the motor rotor to a rotor angle and method thereof.

2. Description of Related Art

A permanent-magnet synchronous motor has the features of energy saving, compact size and easy to control which meet the requirements of the industry, and thus has been gradually accepted by the market and is widely used on industrial applications. In the operation of the permanent-magnet synchronous motor, rotor angle or position information is required, such that a driver can generate proper switching signals for power supply to produce corresponding voltage in driving control. Conventionally, when commutation control of motor is performed, a high precision encoder is necessary to detect the rotor angle as a feedback signal. However, the encoder is usually expensive, structure vulnerable, complicated in wirings, and is easily interfered by electromagnetic noises in practical applications. Except for encoder, some low-cost sensors such as hall sensor can be utilized to provide the basis of rotor commutation and rotational speed calculation for a permanent-magnet synchronous motor. The using of hall sensor can not only achieve the requirements of commutation and speed control, but also simplify the motor control and reduce the cost.

Figure 1:
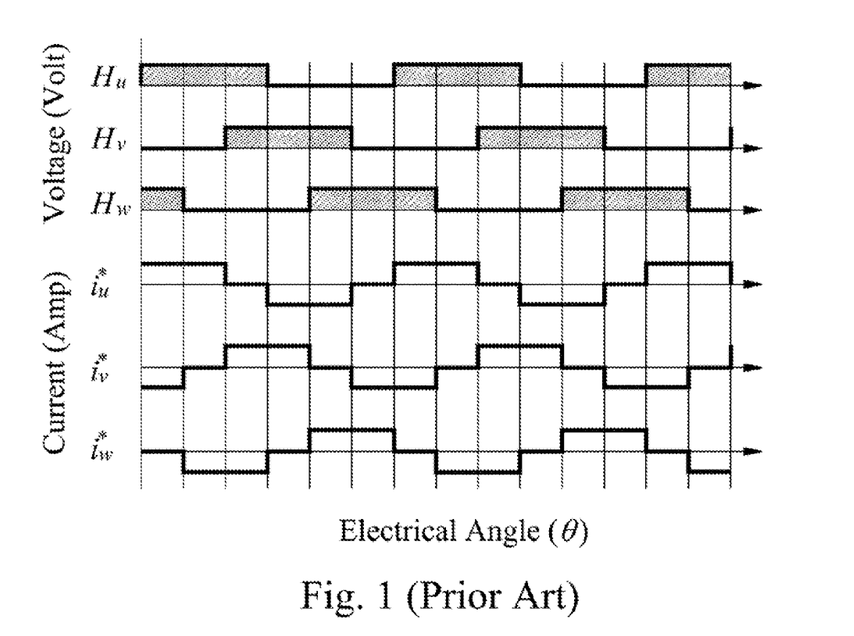
FIG. 1 is a signal diagram generated by a conventional application utilizing a digital hall component.

Referring to a conventional application example shown in FIG. 1, a digital hall component with electrical 60 degrees in resolution is utilized to obtain rotor position roughly while motor rotates. Because six-step trapezoidal phase current control is adopted in that, the inherent larger torque ripple makes it difficult to satisfy the precision requirement of high-end application. Hence, in some known technique, approximate sine wave signal is generated to increase rotor angle resolution by using a linear hall component with similar cost instead.

Figure 2:
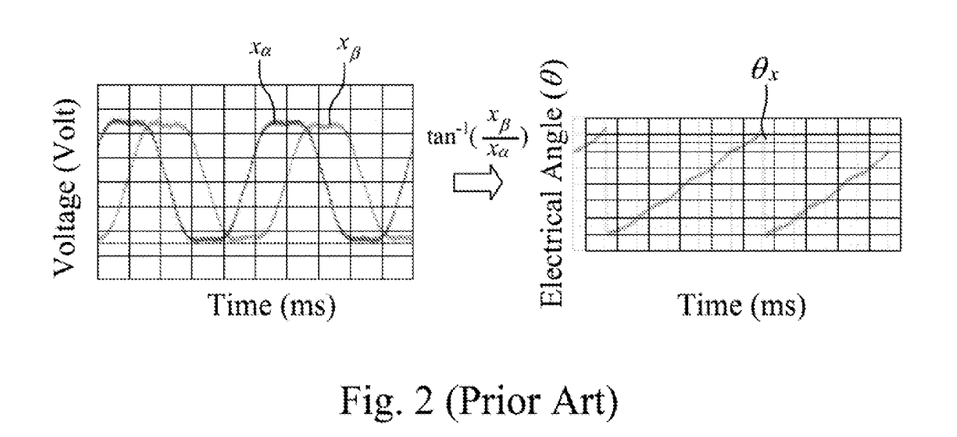
FIG. 2 is a signal diagram generated a conventional application utilizing two analog linear hall components.

Referring to a typical application example using linear hall components shown in FIG. 2, two linear hall components with 90 degrees phase shift are disposed. From their output signals, motor rotor position information can be extracted dealing with their trigonometric relationship. While the imperfect sine waveform of the output hall signals are, larger deviation between the calculated rotor angle and the actual one still exists.

Figure 3:
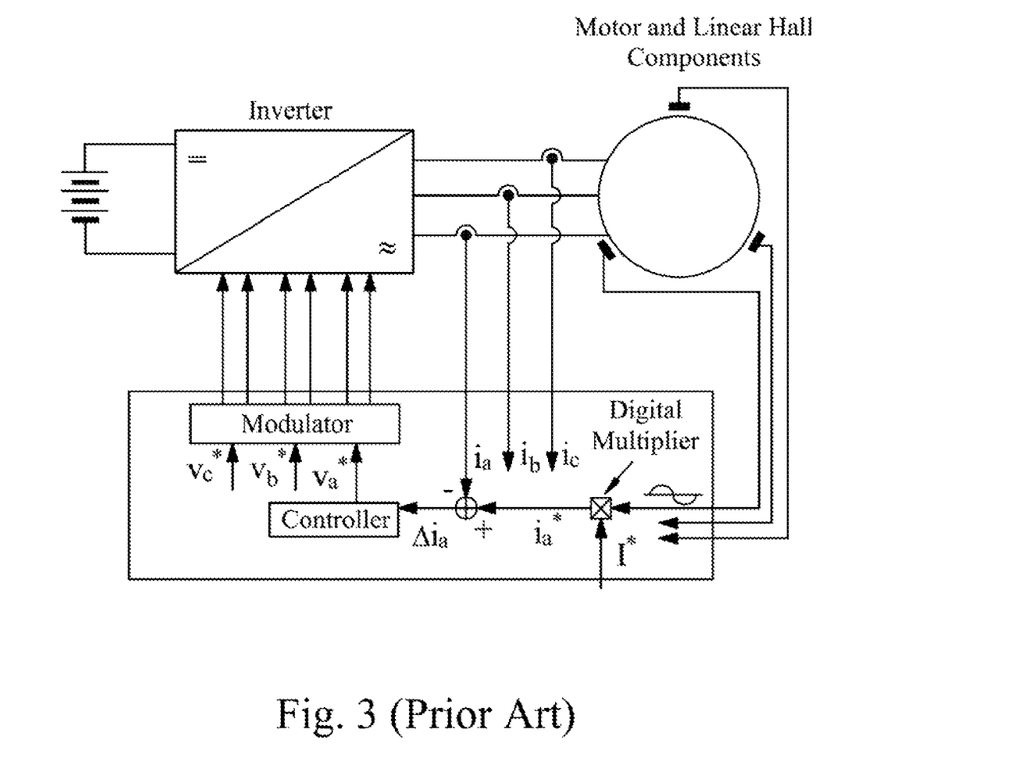
FIG. 3 is a schematic diagram showing a structure of a conventional application case utilizing three analog hall components.

Referring to a conventional application example using linear hall components shown in FIG. 3, the output signals of the three linear hall components are used as three-phase sine wave current commands in current control loop and the subsequent motor speed and direction control. In this case, although torque ripple is smaller than that in the aforementioned case in FIG. 1 because of a sine wave control method used therein, the wave form of the output signal of the linear hall component is still imperfect, and hence results in poor performance on control precision.

From the above application examples, with considerations of cost, reliability, and precision of the motor and its angle detecting system, the method using linear hall components to obtain motor rotor angle information is still a relatively appropriate solution. However, for achieving higher resolution precision of the rotor angle, the imperfect wave form of the output signal generated by the linear hall components needs to be modified to approximate to the actual rotor angle.

SUMMARY

It is an object of the present disclosure to provide an angle detecting module and an angle detecting method for a motor rotor which can effectively and simply modify the signals outputted from the linear hall components, eliminate the harmonic component of the signals, and obtain high precision rotor angle information of a permanent-magnet synchronous motor.

According to one aspect of the present disclosure, an angle detecting module for a motor rotor is provided. The angle detecting module for a motor rotor includes a permanent-magnet synchronous motor, three linear hall components, and a processing device. The permanent-magnet synchronous motor includes a stator and a rotor. The three linear hall components are disposed on the stator and spaced by electrical 120 degrees to measure the magnetic field position of the rotor. Each hall component outputs an analog signal having third harmonic component due to magnetic saturation. The processing device which electrically connected to the linear hall components optimizes these signals and generates an average rotor angle.

According to another aspect of the present disclosure, an angle detecting method for a motor rotor is provided. The angle detecting method includes: provide a permanent-magnet synchronous motor having a stator and a rotor; dispose three linear hall components on the stator, and each linear hall component is spaced by electrical 120 degrees; connect a processing device to the linear hall components; output an analog signal having magnetically saturated third harmonic component to the processing device by each of the linear hall components; optimize each analog signal by the processing device and generate an average rotor angle.

According to still another aspect of the present disclosure, an angle detecting module for a motor rotor is provided. The angle detecting module is disposed on a permanent-magnet synchronous motor. The angle detecting module includes a magnetic disk and a detecting device. The magnetic disk is disposed on the permanent-magnet synchronous motor and is rotated along with the permanent-magnet synchronous motor rotor. The detecting device is disposed on the permanent-magnet synchronous motor relative to the magnetic disk. The detecting device includes three linear hall components and a processing unit. The three linear hall components are spaced by electrical 120 degrees. The linear hall components measure the magnetic field position of the rotor of the permanent-magnet synchronous motor and output analog signals, and each of the analog signals has magnetically saturated third harmonic component. The processing unit is electrically connected to the linear hall components, and the processing unit optimizes each analog signal and generates an average rotor angle.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 4:
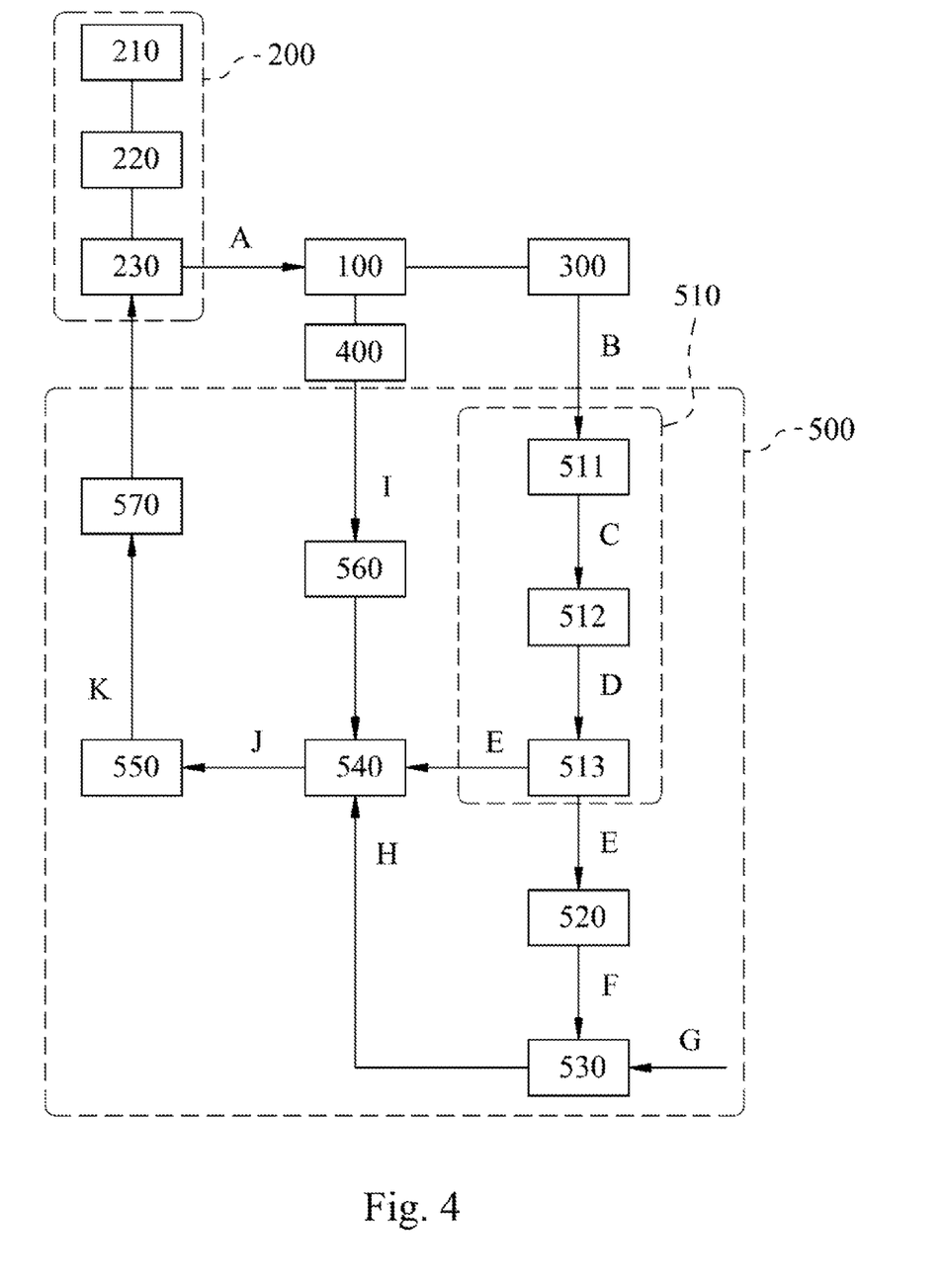
FIG. 4 is a block diagram showing an angle detecting system for a motor rotor according to one embodiment of the present disclosure.

FIG. 4 is a block diagram showing an angle detecting system for a motor rotor according to one embodiment of the present disclosure. A detecting system for a motor rotor includes a permanent-magnet synchronous motor 100, a power switch module 200, three linear hall components 300, a current sensor 400 and a processing module 500.

Figure 5:
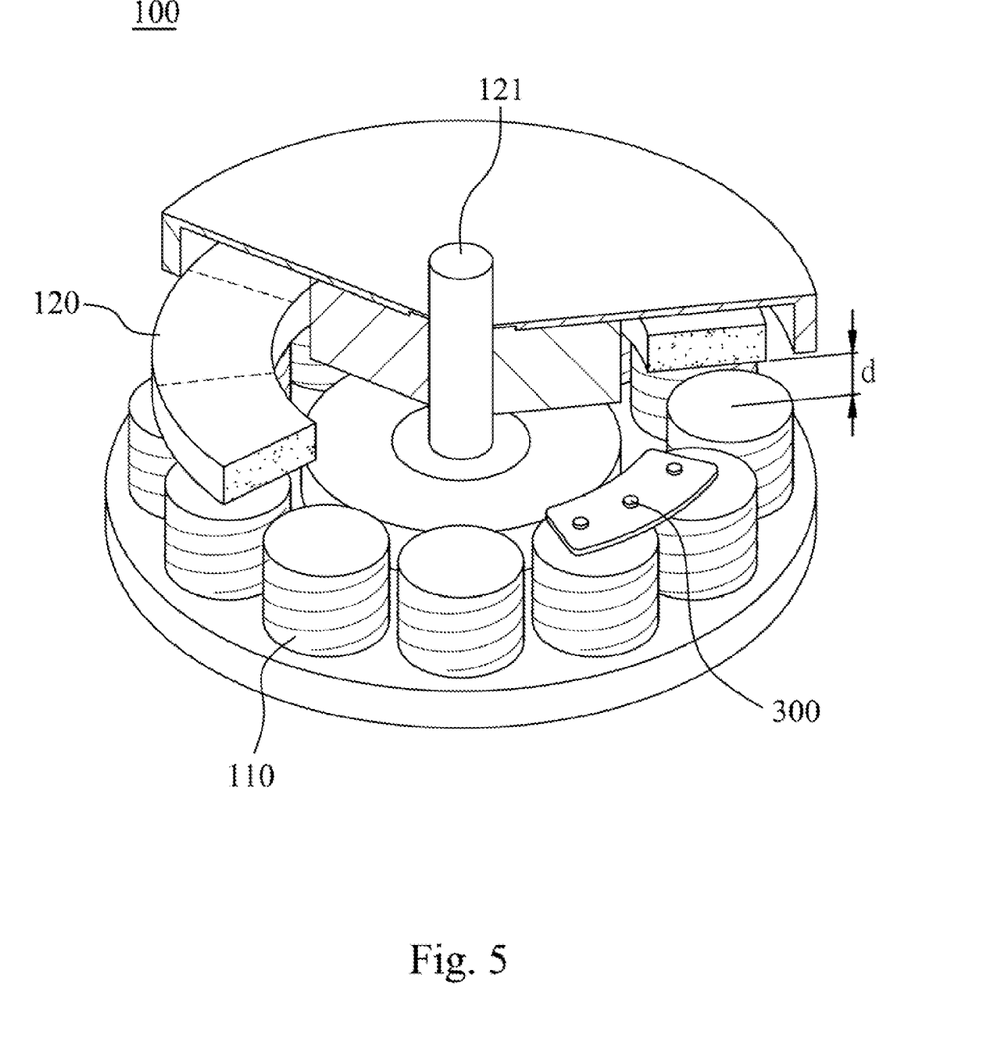
FIG. 5 is a cross-sectional view showing analog linear hall components disposed on a permanent-magnet synchronous motor.

FIG. 5 is a cross-sectional view showing analog hall components disposed on a permanent-magnet synchronous motor 100. The permanent-magnet synchronous motor 100 includes a stator 110 and a rotor 120. An air gap d is formed between the stator 110 and the rotor 120. In the embodiment, the permanent-magnet synchronous motor 100 belongs to an axial air gap type motor. But in some examples, the motor 100 can be the structure with radial air gap. An axis 121 is bulgingly disposed in the center of the rotor 120, and the axis 121 is located in the center of the surrounding stators 110. The rotor 120 can self-rotate relative to the stator 110.

The power switch module 200 is electrically connected to the permanent-magnet synchronous motor 100. The power switch module 200 includes a power supply 210, a voltage stabilizer 220 and power switches 230. The power switches 230 of the power switch module 200 receives a stable DC voltage provided by the power supply 210, and outputs control signals A to drive the permanent-magnet synchronous motor 100.

Three linear hall components 300 are disposed on the stator 110 side, and are spaced by electrical 120 degrees. In FIG. 5, a distance between the linear hall components 300 and the rotor 120 is equal to an air gap d, or the distance between the linear hall components 300 and the rotor 120 is greater than the air gap d by 0.01 mm to 1 mm. The linear hall components 300 measure the magnetic field position of the rotor 120, and each linear hall component 300 outputs an analog signal B, thereby obtaining an angle information of the rotor 120. Based on that angle information, commutation and speed control of the permanent-magnet synchronous motor 100 are conducted. The three linear hall components on the stator 110 side are disposed as close as possible to the magnetic pole of the rotor 120. Therefore, each analog signal B of the three linear hall components 300 has third harmonic component due to magnetic saturation.

The current sensor 400 senses the control signals A transferred from the power switches 230 to the permanent-magnet synchronous motor 100 and outputs a feedback current I. The feedback current I as the analog signal B, is a basis for commutation and speed control of the permanent-magnet synchronous motor 100.

The processing module 500 is electrically connected to the power switch module 200, the linear hall components 300 and the current sensor 400. The processing module 500 includes an optimizer 510, a differentiator 520, a speed controller 530, a current controller 520, a pulse width modulator 550, an analog/digital converting interface 560 and a digital output interface 570. The optimizer 510 includes a filter 511, a converting unit 512 and an averaging unit 513. The filter 511 is connected to the linear hall components 300, and receives each analog signal B from them. The filter 511 eliminates the magnetically saturated third harmonic component of the analog signal B, and then outputs a relative analog signal C. The converting unit 512 is connected to the filter 511 for converting each relative analog signal C and outputting a rotor angle D. The averaging unit 513 is connected to the converting unit 512 for calculating the average value of each rotor angle D and outputting an average rotor angle E. The differentiator 520 is connected to the averaging unit 513 for differentiating the average rotor angle E and outputting a rotor rotational speed F. The speed controller 530 receives the rotor rotational speed F and a rotational speed command G, and outputs a reference current command H. The current controller 540 is connected to the analog/digital converting interface 560, the averaging unit 513 and the speed controller 530, and the analog/digital converting interface 560 is connected to the current sensor 400, such that the current controller 540 can receive the feedback current I, the average rotor angle E and the reference current command H and output a motor duty cycle J. The pulse width modulator 550 is connected to the current controller 540 and the digital output interface 570, and the digital output interface 570 is connected to the power switch module 200, such that the pulse width modulator 550 receives the motor duty cycle J and output a switching signal K. The switching signal K is outputted to the power switch module 200 through the digital output interface 570. The rotational speed command G can be inputted by a software or a hardware.

Figure 6:
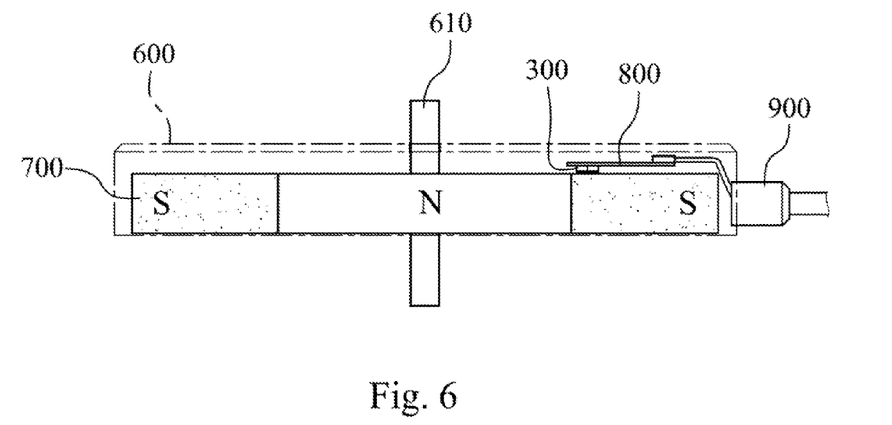
FIG. 6 is a side view showing an angle detecting module for a motor rotor according to another embodiment of the present disclosure.
Figure 7:
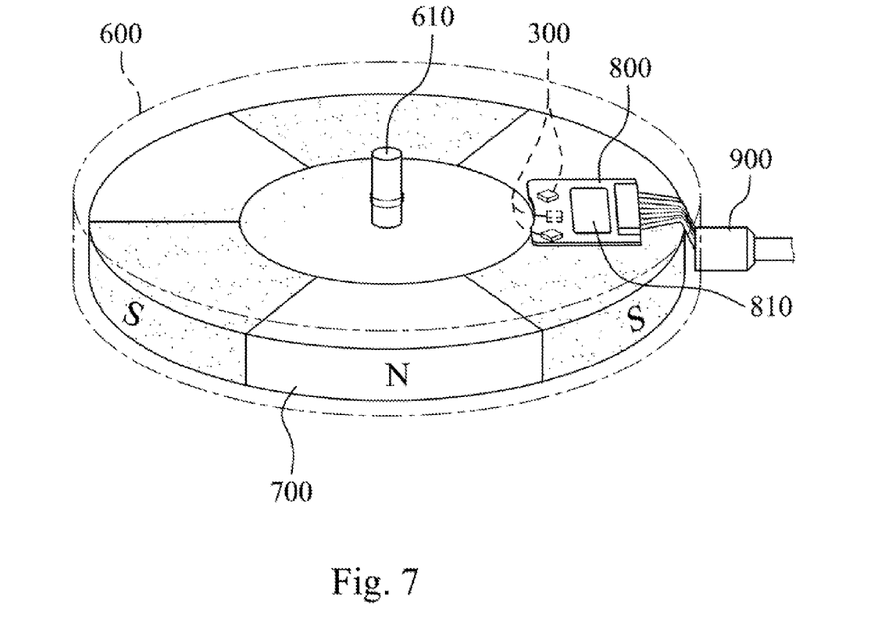
FIG. 7 is a schematic diagram showing an angle detecting module of FIG. 6.

FIG. 6 is a side view showing an angle detecting module for a motor rotor according to another embodiment of the present disclosure, and FIG. 7 is a schematic diagram showing an angle detecting module of FIG. 6. An angle detecting module for a motor rotor includes an outer box 600, a magnetic disk 700, a detecting device 800 and an output component 900.

The outer box 600 is disposed on an outer area of the permanent-magnet synchronous motor (not shown). A connecting axis 610 is disposed through the outer box 600 for linking to the permanent-magnet synchronous motor (not shown). The magnetic disk 700 is disposed within the outer box 600 relative to the permanent-magnet synchronous motor. The magnetic disk 700 and the permanent-magnet synchronous motor are linked with the connecting axis 610, and the magnetic disk 700 is rotated along with the permanent-magnet synchronous motor rotor. The detecting device 800 is disposed close to the magnetic disk 700 and is disposed fixed on the outer box 600. The detecting device 800 includes three linear hall components 300 and a processing chip 810. The linear hall components 300 are spaced by electrical 120 degrees. The linear hall components 300 arranged on the outer box 600 are disposed close to the magnetic disk 700, results in sensed signals having the third harmonic component due to magnetic saturation. The processing chip 810 is disposed on the outer box 600 and has a processing module (not shown) integrating the processing module shown in FIG. 4 in it. The processing chip 810 is electrically connected to the linear hall components 300. The output component 900 is disposed on the outer box 600 and is electrically connected to the processing chip 810.

In this embodiment, after being actuated, the permanent-magnet synchronous motor rotates the magnetic disk 700 through the connecting axis 610. Due to the linear hall components 300 are very close to the magnetic disk 700, the signal sensed by the linear hall components 300 is magnetically saturated and has rich third harmonic component on them. By using the processing chip 810, the magnetically saturated third harmonic component can be eliminated and the average rotor angle of the permanent-magnet synchronous motor is generated. The output component 900 is used to output the average rotor angle to an outer device. The outer device can be a power switch module similar to the aforementioned embodiments; and the outer device controls the permanent-magnet synchronous motor in accordance with the average rotor angle. Moreover, the magnetic disk 700 and the detecting device 800 are installed in the outer box 600, so that it is convenient to dismantle the angle detecting module from the motor rotor. The device used to eliminate the magnetically saturated third harmonic component is not limited to the processing chip 810, but also can be a hardware circuit or other device for the same purpose.

Figure 8:
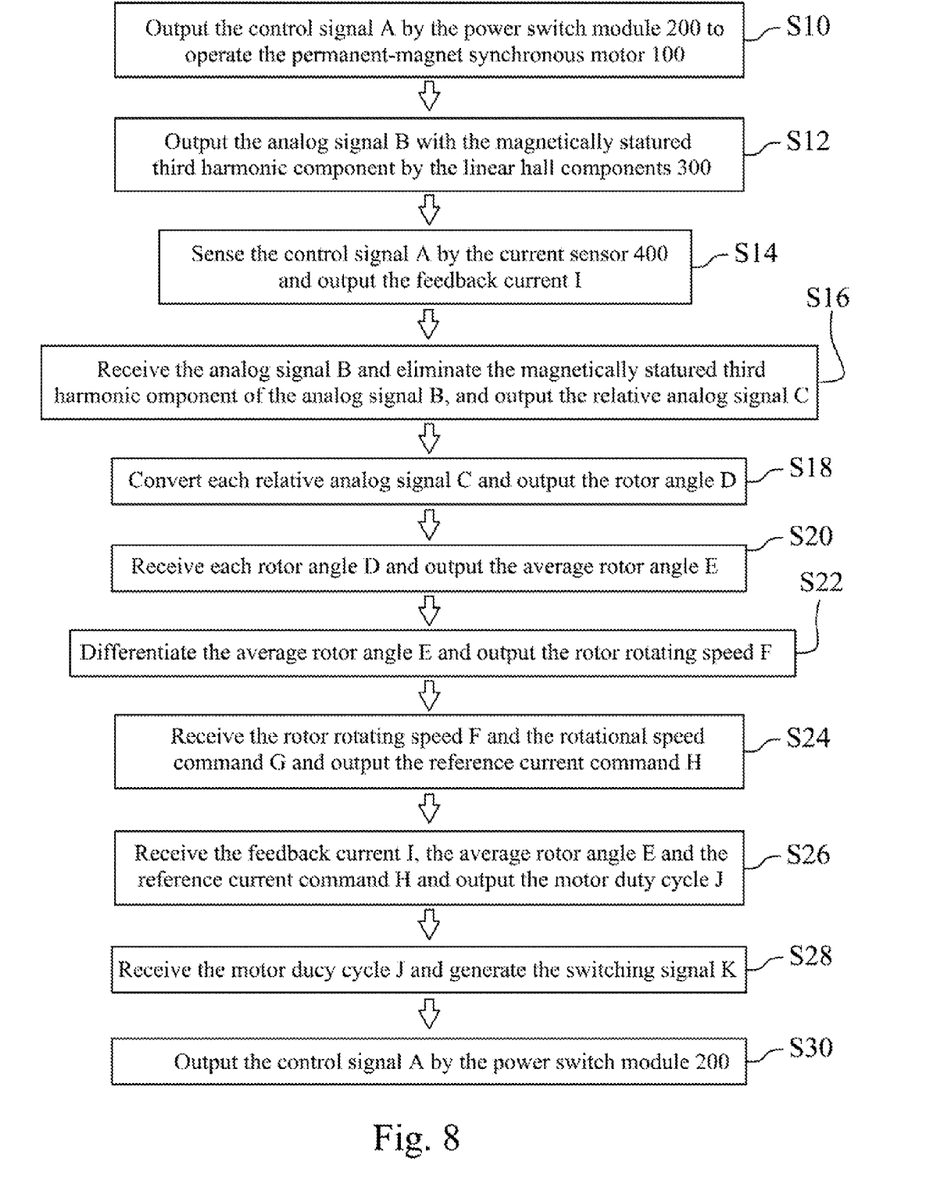
FIG. 8 is a flow chart showing an angle detecting method for a motor rotor according to one embodiment of the present disclosure.

FIG. 8 is a flow chart showing an angle detecting method for a motor rotor according to one embodiment of the present disclosure. In FIG. 8, the aforementioned angle detecting module for a motor rotor shown in FIG. 4 is applied. The steps includes: step S10 for outputting the control signal A by the power switch module 200 to operate the permanent-magnet synchronous motor 100; step S12 for outputting the analog signal B with the magnetically saturated third harmonic component by the linear hall components 300; step S14 for sensing the control signal A by the current sensor 400 and output the feedback current I; step S16 for receiving the analog signal B and eliminating the magnetically saturated third harmonic component of the analog signal B, and output the relative analog signal C; step S18 for converting each relative analog signal C and outputting the rotor angle D; step S20 for receiving each rotor angle D and outputting the average rotor angle E; step S22 for differentiating the average rotor angle E and outputting the rotor rotating speed F; step S24 for receiving the rotor rotating speed F and the rotational speed command G and outputting the reference current command H; step S26 for receiving the feedback current I, the average rotor angle E and the reference current command H and outputting the motor duty cycle J; step S28 for receiving the motor duty cycle J and generating the switching signal K; and step S30 for outputting the control signal A by the power switch module 200.

Figure 9:
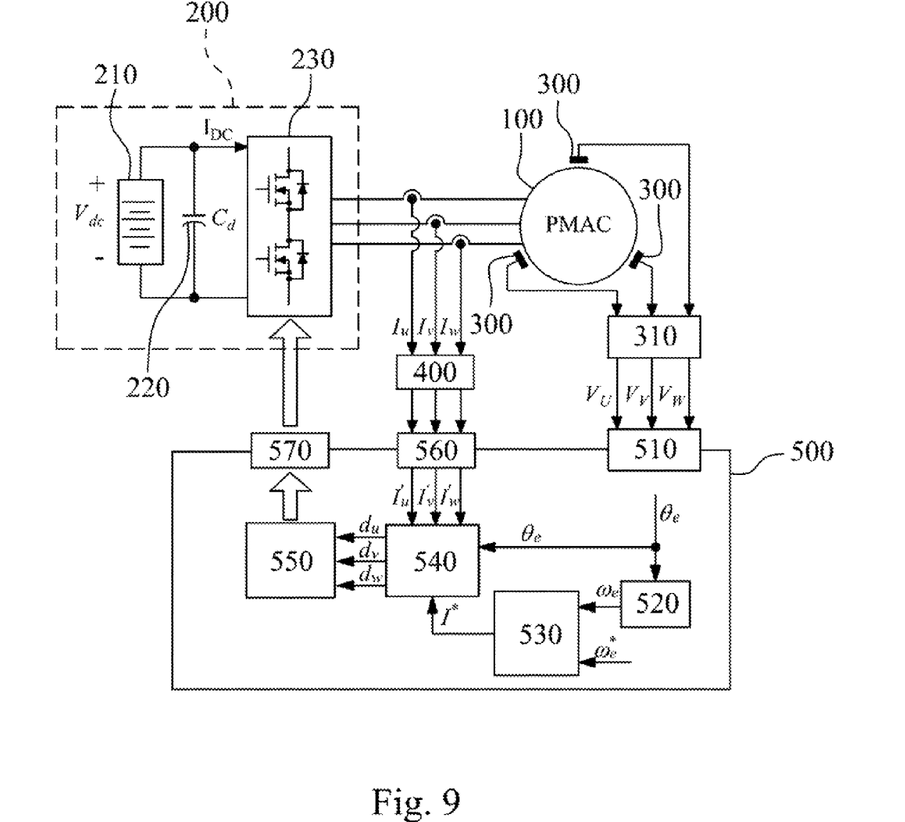
FIG. 9 is a schematic diagram showing an angle detecting system for a motor rotor according to one embodiment of the present disclosure.
Figure 10:
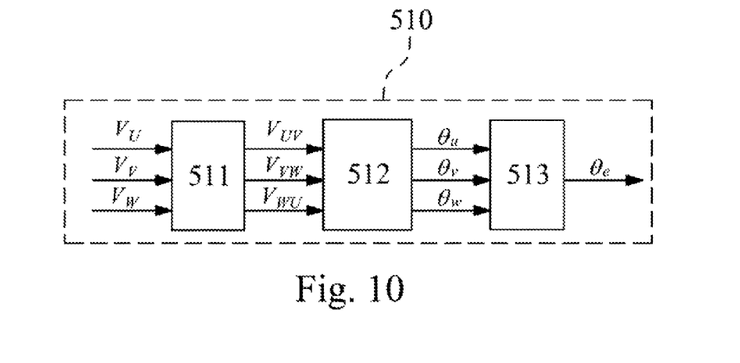
FIG. 10 is a schematic diagram of an optimizer.

FIG. 9 is a schematic diagram showing an angle detecting system for a motor rotor according to one embodiment of the present disclosure, and FIG. 10 is a schematic diagram of an optimizer 510.

The power supply 210 provides a DC current $I_{DC}$, and the power supply 210 is connected with the voltage stabilizer 220 and the power switches 230 in parallel. The voltage stabilizer 220 can stabilize the DC current $I_{DC}$. The power switches 230 receives the DC current $I_{DC}$, and converts the large DC voltage to three phase AC voltage by a pulse width modulation, and generates three phase currents $I_u$, $I_v$ and $I_w$ to drive the permanent-magnet synchronous motor 100.

The three phase currents $I_u$, $I_v$ and $I_w$ are sensed by the current sensor 400, and are inputted through the analog/digital converting interface 560 to the current controller 540 of the processing module 500, thereby generating three phase feedback currents $I'_u$, $I'_v$ and $I'_w$.

The linear hall components 300 measure the magnetic field position of the rotor 120 and output analog signals $V_U$, $V_V$ and $V_W$ to the processing module 500. The magnitude of output analog signals $V_U$, $V_V$ and $V_W$ is proportional to the magnetic flux of a magnetic pole of the rotor 120.

The processing module 500 receives the output analog signals $V_U$, $V_V$ and $V_W$, and obtains the electrical angle $\theta_e$. On one hand, the electrical angle $\theta_e$ of the rotor 120 is inputted to the differentiator 520 to obtain the motor rotating speed $\omega_e$, and the three phase current reference command I* is generated by the speed controller 530 in accordance with the motor rotating speed $\omega_e$; on the other hand, the electrical angle $\theta_e$ is inputted to the current controller 540 and provides the angle information required for the three phase feedback currents $I'_u$, $I'_v$ and $I'_w$ to control the permanent-magnet synchronous motor 100. The current controller 540 generates three phase voltage duty ratios $d_u$, $d_v$ and $d_w$, and the three phase voltage duty ratios $d_u$, $d_v$ and $d_w$ are inputted into the pulse width modulator 550. The pulse width modulator 550 receives the three phase voltage duty ratios $d_u$, $d_v$ and $d_w$, and outputs a power switch driving signal through the digital output interface 570. The power switch driving signal controls the switching of the power switches 230, thereby controlling, the commutation and the rotational speed of the permanent-magnet synchronous motor 100.

Figure 11A:
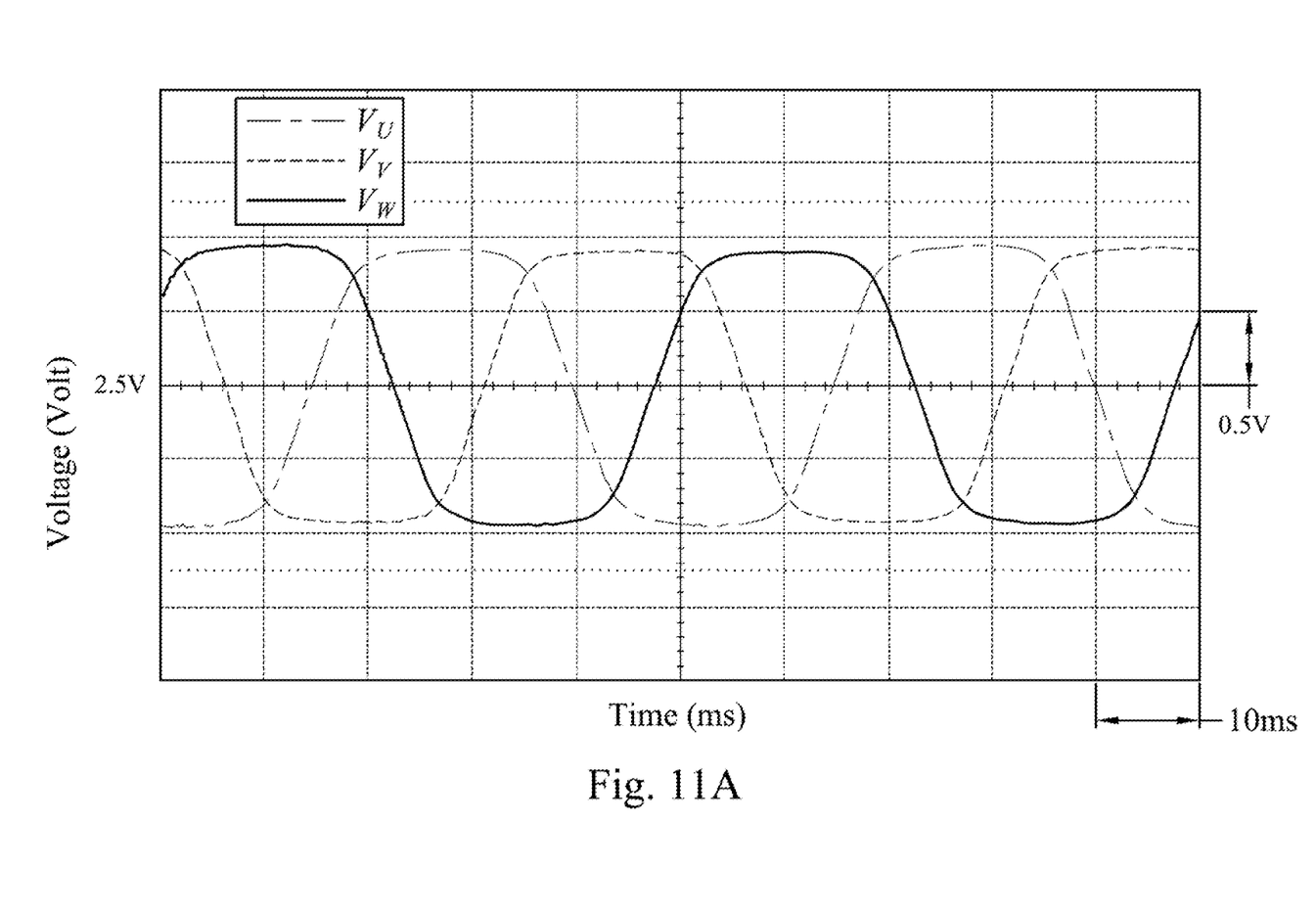
FIG. 11A is a signal diagram outputted by linear hall components.
Figure 11B:
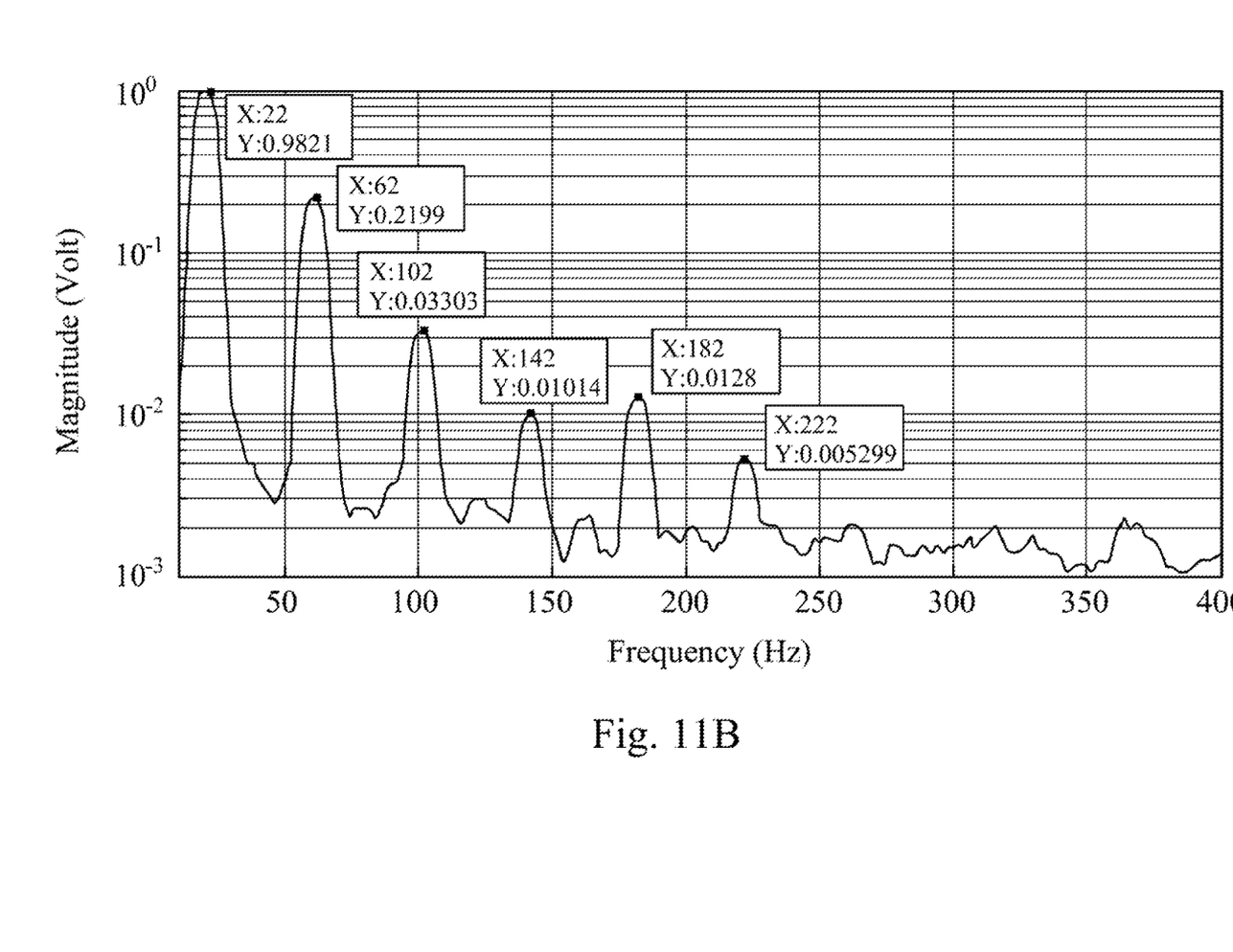
FIG. 11B is a frequency spectrum of output signal from a linear hall component.

In the embodiment, the function of the processing module 500 can be achieved by a hardware method or a software method. FIG. 11A is a signal diagram outputted by linear hall components, and FIG. 11B is a frequency spectrum of output signal from linear hall component. The analog signals $V_C$, $V_V$ and $V_W$ received by an optimizer 510 have third harmonic component of 22.4% of the fundamental frequency, and can be expanded by a Fourier series as follows:

$$V_U = V_{dc} + v_1 \sin(\omega_e t) + \sum_{h=1}^{\infty} v_{2h+1} \sin((2h+1)\omega_e t)$$

$$V_V = V_{dc} + v_1 \sin\left(\omega_e t - \frac{2\pi}{3}\right) + \sum_{h=1}^{\infty} v_{2h+1} \sin\left((2h+1)\left(\omega_e t - \frac{2\pi}{3}\right)\right)$$

-continued $$V_W = V_{dc} + v_1 \sin\left(\omega_e t + \frac{2\pi}{3}\right) + \sum_{h=1}^{\infty} v_{2h+1} \sin\left((2h+1)\left(\omega_e t + \frac{2\pi}{3}\right)\right)$$

where $V_{dc}$ is a DC component. The analog signals $V_U$, $V_V$ and $V_W$ are phase shifted by electrical 120 degrees each other, and have DC component. Therefore, similar to the three phase system, the third harmonic component and the DC component can be eliminated by taking out the line to line voltage. That is, every two of the analog signals $V_U$, $V_V$ and $V_W$ can be subtracted from each other by using a hardware or software approach to obtain relative analog signals $V_{UV}$, $V_{VW}$ and $V_{WU}$ approximating to sine wave. Their Fourier series expansions are as follows:

$$V_{UV} = V_U - V_V$$
$$= \sqrt{3}\left[v_1 \sin\left(\omega_e t + \frac{\pi}{6}\right) + \sum_{h \neq 1,4,7,10...}^{\infty} v_{2h+1} \sin\left((2h+1)\left(\omega_e t + \frac{\pi}{6}\right)\right)\right]$$

$$V_{VW} = V_V - V_W$$
$$= \sqrt{3}\left[v_1 \sin\left(\omega_e t + \frac{\pi}{6} - \frac{2\pi}{3}\right) + \sum_{h \neq 1,4,7,10...}^{\infty} v_{2h+1} \sin\left((2h+1)\left(\omega_e t + \frac{\pi}{6} - \frac{2\pi}{3}\right)\right)\right]$$

$$V_{WU} = V_W - V_U$$
$$= \sqrt{3}\left[v_1 \sin\left(\omega_e t + \frac{\pi}{6} + \frac{2\pi}{3}\right) + \sum_{h \neq 1,4,7,10...}^{\infty} v_{2h+1} \sin\left((2h+1)\left(\omega_e t + \frac{\pi}{6} + \frac{2\pi}{3}\right)\right)\right]$$

Figure 12A:
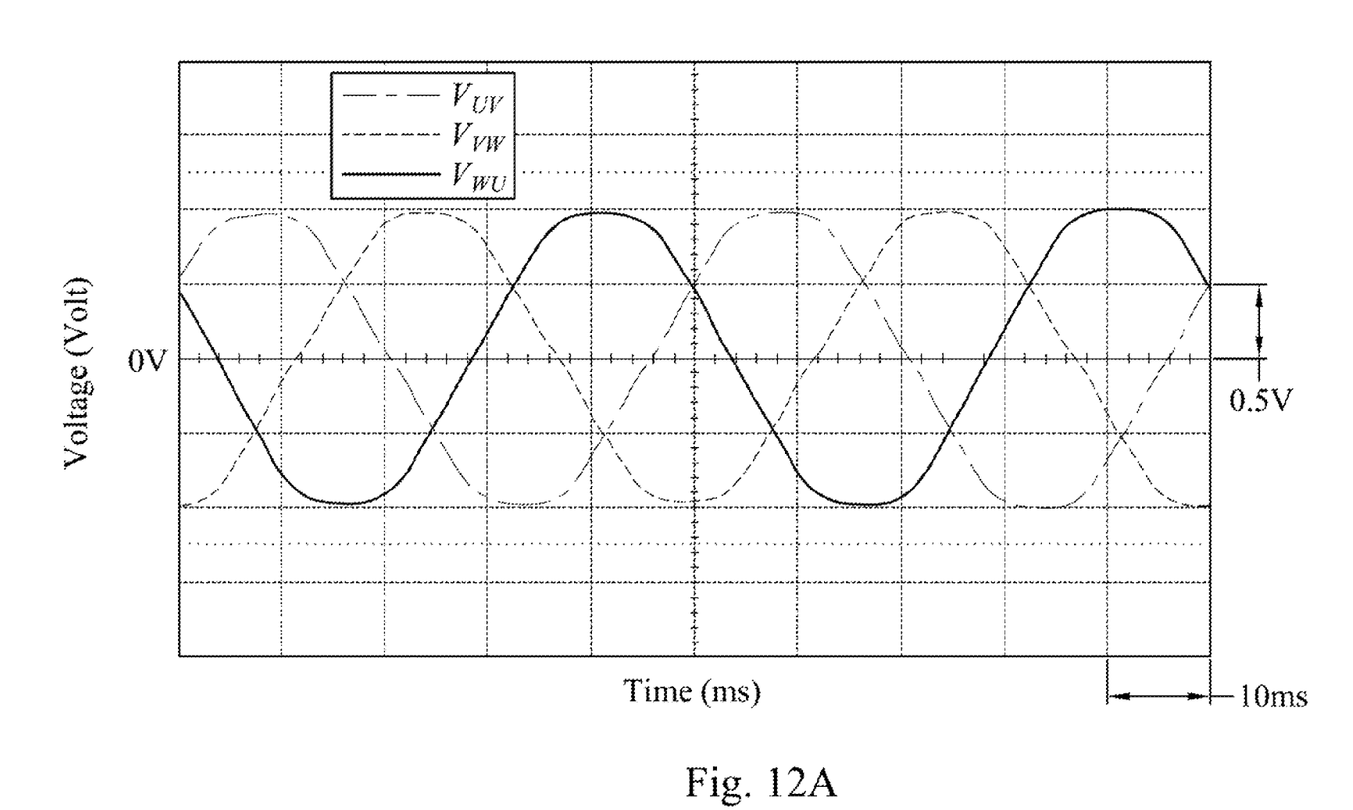
FIG. 12A is a signal diagram outputted by linear hall components eliminating the third harmonic component.
Figure 12B:
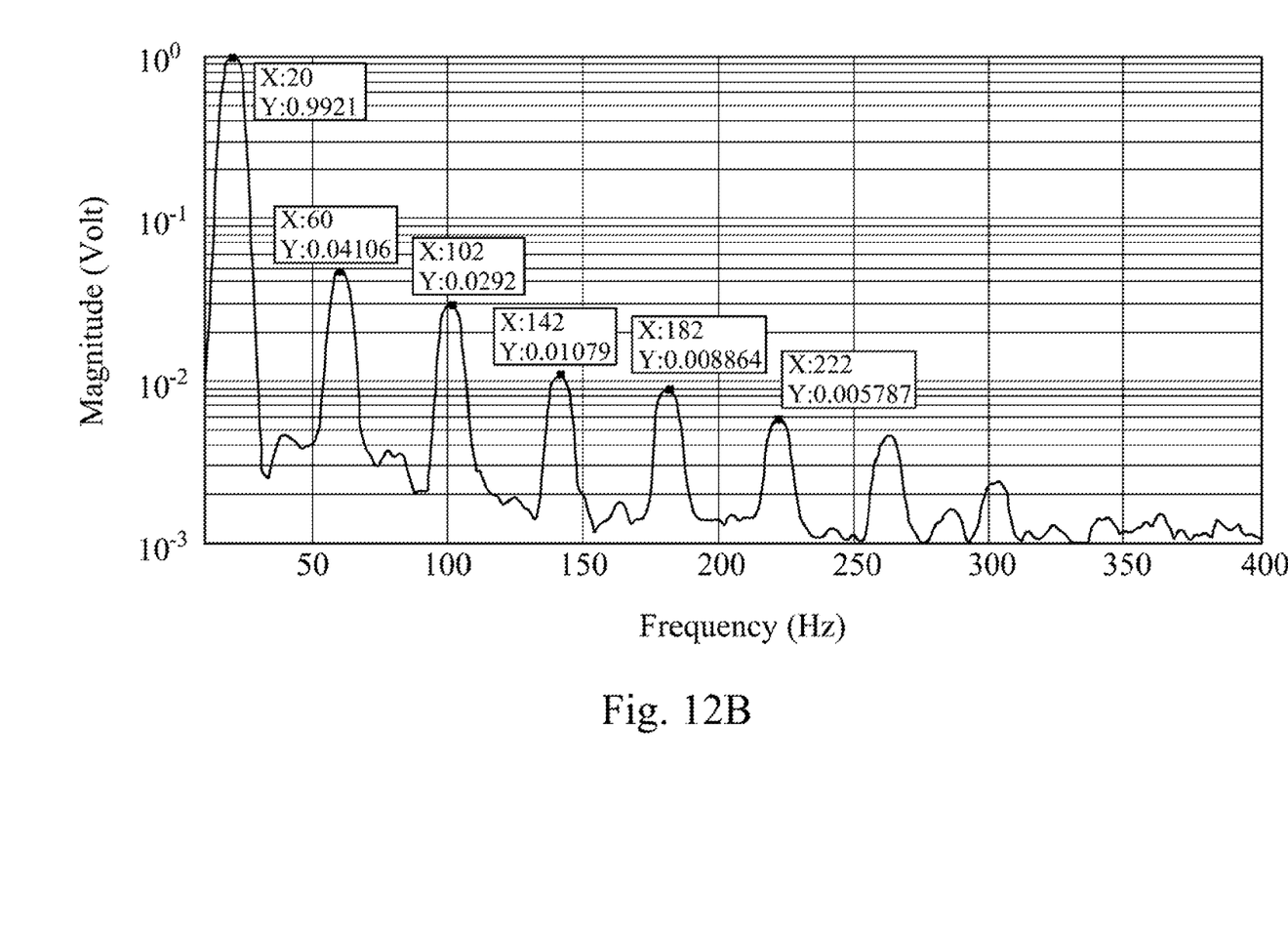
FIG. 12B is a frequency spectrum of output signal from a linear hall component eliminating the third harmonic component.

The results are shown in FIG. 12A and FIG. 12B. FIG. 12A is a signal diagram outputted by linear hall components eliminating the third harmonic component and FIG. 12B is a frequency spectrum of output signal from a linear hall component eliminating the third harmonic component. In FIG. 12A and FIG. 12B, it is shown that most of the third harmonic components are eliminated with only 4.7% remaining.

The eliminating process shown in the above will cause electrical 30 degrees phase advance in analog signals $V_U$, $V_V$ and $V_W$ relative to the phase back electromotive force of the permanent-magnet synchronous motor 100. Therefore, in order to compensate this phase shift, it is necessary to lag electrical 30 degrees in purpose relative to the phase back electromotive force of the permanent-magnet synchronous motor 100 when the three linear hall components 300 are installed.

Figure 13:
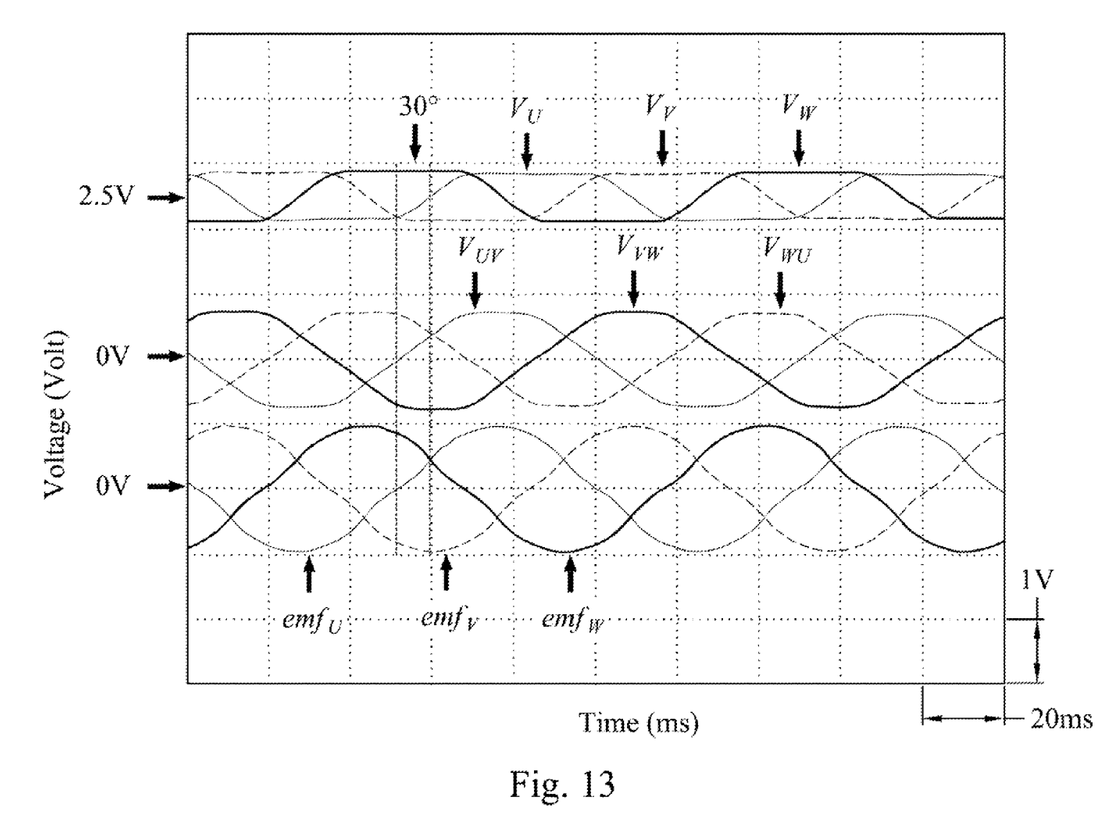
FIG. 13 is a comparison diagram among analog signals from hall sensors, relative analog signals from hall sensors and measured waveforms of phase back electromotive force.

FIG. 13 is a comparison diagram among analog signals $V_U$, $V_V$ and $V_W$ from hall sensors, relative analog signals $V_{UV}$, $V_{VW}$ and $V_{WU}$ from hall sensors and measured waveforms of phase back electromotive force $emf_U$, $emf_V$ and $emf_W$. After the angle shift is compensated, the relative analog signals $V_{UV}$, $V_{VW}$ and $V_{WU}$ are in phase with the phase back electromotive force $emf_U$, $emf_V$ and $emf_W$, thereby obtaining the correct absolute angle of rotor.

The wave forms of relative analog signals $V_{UV}$, $V_{VW}$ and $V_{WU}$ obtained from analog signals $V_U$, $V_V$ and $V_W$ eliminating the third harmonic component by the filter 511 are in phase with phase back electromotive force $emf_U$, $emf_V$ and $emf_W$ and are very close to sine waves. They can therefore be expressed as follows:

$$V_{UV} = V_{ref} \sin(\theta_u(t))$$
$$V_{VW} = V_{ref} \sin\left(\theta_v(t) - \frac{2\pi}{3}\right)$$
$$V_{WU} = V_{ref} \sin\left(\theta_w(t) + \frac{2\pi}{3}\right)$$

The electrical angles of the rotor can be obtained by applying the inverse of the trigonometric functions to the above equations as follows:

$$\theta_u(t) = \sin^{-1}\frac{V_{UV}}{V_{ref}}$$
$$\theta_v(t) = \sin^{-1}\frac{V_{VW}}{V_{ref}} + \frac{2\pi}{3}$$
$$\theta_w(t) = \sin^{-1}\frac{V_{WU}}{V_{ref}} - \frac{2\pi}{3}$$

Normally, the electrical angles $\theta_u$, $\theta_v$ and $\theta_w$ should be the same. In order to prevent noise disturbance and lower the influence from the harmonic components of the signals, an average value of the electrical angles $\theta_u$, $\theta_v$ and $\theta_w$ is calculated using averaging unit 513. A precision electrical angle $\theta_e$ can be obtained by:

$$\theta_e(t) = \frac{\theta_u(t) + \theta_v(t) + \theta_w(t)}{3}$$

Figure 14:
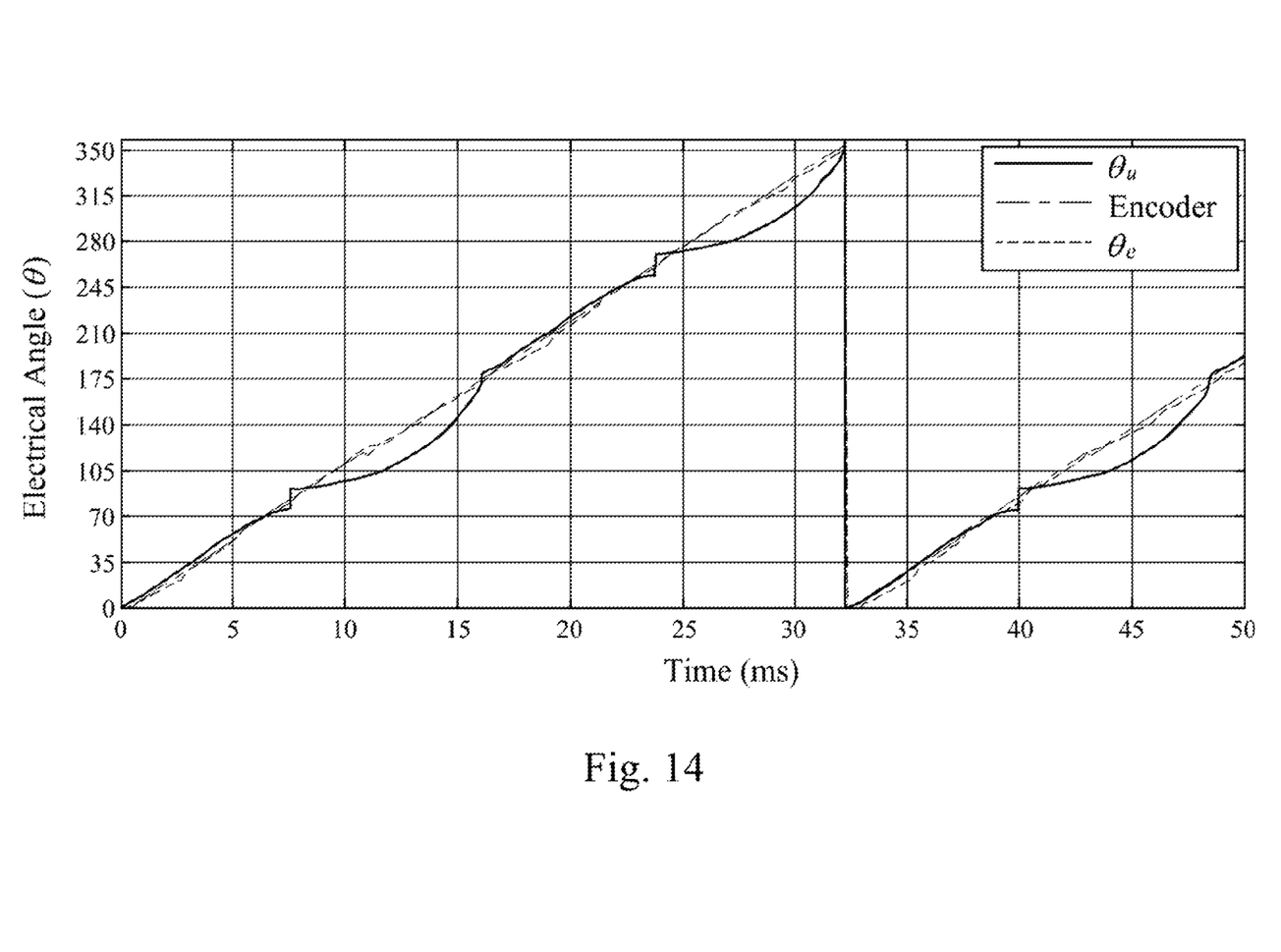
FIG. 14 is a comparison diagram among a calculated rotor angle from sole linear hall sensor, an optimized average rotor angle from three hall sensors and a measured angle from an encoder.

FIG. 14 is a comparison diagram among a calculated rotor angle from sole linear hall sensor, an optimized average rotor angle from three hall sensors and a measured angle from an encoder. The optimized average angle $\theta_e$ from averaging unit 513 is averaging much close to the measured angle from an encoder with high precision then original calculated ones $\theta_u$, $\theta_v$ and $\theta_w$.

From the above descriptions, the advantages of the present disclosure are stated as follow:

1. When the three linear ball components are installed on the stator, they are spaced by electrical 120 degrees, and arranged for having electrical 30 degrees phase lag to the phase back electromotive force of the permanent-magnet synchronous motor. Hence, the generated phase advance while eliminating the third harmonic component of the signal can be compensated. Subsequently, the analog signals can form a stable square-liked waveform, which can lower the sensitivity of the linear hall component to the strength of the magnet flux, the position of the sensor, the effect of armature reaction and the temperature effect of the air gap flux. Therefore, low cost and high precision can be achieved in the present disclosure. The processing module cooperated with the linear hall components can generate angle information, and is applicable to various types of permanent-magnet synchronous motors.

2. The processing module can eliminate most of the third harmonic component after compensating the analog signals, and then obtain the pole position of the three rotors of the permanent-magnet synchronous motor. After the calculation of the average of the rotor angle, a high reliable and precision rotor angle can be obtained, and hence the precise control of the permanent-magnet synchronous motor.

3. The angle detecting module for a motor rotor of the present disclosure can be integrally manufactured into a circuit chip or a hardware circuit, and can be disposed on the permanent-magnet synchronous motor in cooperation with a magnetic disk. Therefore, the angle detecting module not only can achieve the same rotor angle detecting function, but also can be detachable from the permanent-magnet synchronous motor.

It will be apparent to those skilled, in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An angle detecting module for a motor rotor, comprising:
   a permanent-magnet synchronous motor comprising a stator and a rotor;
   three linear hall components disposed on the stator, wherein the linear hall components are spaced by electrical 120 degrees, and each of the linear hall components outputs an analog signal after measuring a magnetic field position of the rotor, each of the analog signals has magnetically saturated third harmonic components; and
   a processing device electrically connected to the linear hall components, the processing device optimizing each of the analog signals and generating an average rotor angle.

2. The angle detecting module of claim 1, wherein a phase shift between the analog signals of the linear hall components is 120 degrees.

3. The angle detecting module of claim 1, wherein the permanent-magnet synchronous motor has three phase back electromotive forces, and each of the analog signal lags its corresponding phase back electromotive force by 20 degrees to 40 degrees.

4. The angle detecting module of claim 3, wherein each of the analog signals lags its corresponding phase back electromotive force by 30 degrees.

5. The angle detecting module of claim 1, wherein each of the analog signals has a fundamental frequency component, and the magnetically saturated third harmonic component of each of the analog signals is 5% to 40% of the fundamental frequency component.

6. The angle detecting module of claim 1, wherein an air gap is formed between the stator and the rotor, and a distance is formed between the linear hall components and the rotor, wherein the distance is equal to the length of the air gap.

7. The angle detecting module of claim 1, wherein air air gap is formed between the stator and the rotor, and a distance is formed between the linear hall components and the rotor, wherein the distance is 0.01 mm to 1 mm greater than the length of the air gap.

8. The angle detecting module of claim 1, wherein the processing device comprises an optimizer optimizing each of the analog signals and generating an average rotor angle.

9. The angle detecting module of claim 8, wherein the optimizer comprises:
   an electronic filter for filtering out the third harmonic component and outputting a relative analog signal;
   a converting unit for converting each of the analog relative signals and outputting a rotor angle; and
   an averaging unit for receiving each of the rotor angles and outputting an average rotor angle.

10. The angle detecting module of claim 9, further comprising:
    a power switch module outputting a control signal for controlling the permanent-magnet synchronous motor.

11. The angle detecting module of claim 1, further comprising:
    a differentiator differentiating the average rotor angle and outputting a rotor rotational speed;
    a speed controller receiving the rotor rotating speed and outputting a reference current command;
    a current sensor sensing a control signal and outputting a feedback current;
    a current controller receiving the feedback current, the average rotor angle, and the reference current command and outputting a motor duty cycle; and
    a pulse width modulator receiving the motor duty cycle and generating a switching signal to the power switch module.

12. The angle detecting module of claim 11, wherein the power switch module comprises:
    a power supply for outputting a voltage;
    a stabilizer connected to the power supply for stabilizing the voltage; and
    six power switches connected to the stabilizer, the power switches receiving the switching signal and the voltage and outputting a control signal.

13. An angle detecting, method for a motor rotor, comprising:
    providing a permanent-magnet synchronous motor having a stator and a rotor;
    disposing three linear hall components on the stator, wherein each of the linear hall components is spaced by electrical 120 degrees;
    connecting a processing device to the linear hall components;
    outputting an analog signal having a magnetically saturated third harmonic component to the processing device by each of the linear hall components; and
    optimizing each of the analog signals by the processing device and generating an average rotor angle.

14. The angle detecting method of claim 13, wherein the step of optimizing each analog signal by the processing device and generating an average rotor angle further comprises:
    eliminating the magnetically saturated third harmonic component and outputting a relative analog signal;
    converting each of the relative analog signals for outputting a rotor angle; and
    averaging the rotor angle and generating the average rotor angle.

15. The angle detecting method of claim 13, further comprising:
    optimizing the average rotor rotating speed and generating a switching signal by the processing device; and
    providing a power switch module for receiving the switching signal, the power switch module outputting a control signal for controlling the permanent-magnet synchronous motor.

16. The angle detecting method of claim 15, wherein the step of optimizing the average rotor rotating speed and generating the switching signal by the processing device further comprises:
    sensing the control signal and outputting a feedback current;

optimizing each analog signal and generating an average rotor angle;

differentiating the rotor angle and outputting a rotor rotating speed;

receiving the rotor rotating speed and outputting a reference current command;

receiving a rotating speed command, the feedback current, the rotor angle and the reference current command and outputting a motor duty cycle; and receiving the motor duty cycle and generating the switching signal.

17. The angle detecting method of claim 13, wherein a phase shift between each of the analog signals of the linear hall components is 120 degrees.

18. The angle detecting method of claim 13, wherein the permanent-magnet synchronous motor has three phase back electromotive forces, and each of the analog signal lags its corresponding phase back electromotive force by 20 degrees to 40 degrees.

19. The angle detecting method of claim 18, wherein each of the analog signals lags its corresponding phase hack electromotive force by 30 degrees.

20. The angle detecting method of claim 13, wherein each analog signal has a fundamental frequency component, and the magnetically saturated third harmonic component of each of the analog signals is 5% to 40% of the fundamental frequency component.

21. The angle detecting method of claim 13, wherein an air gap is formed between the stator and the rotor, and a distance is formed between the linear hall components and the rotor, wherein the distance is equal to a length of the air gap.

22. The angle detecting method of claim 13, wherein an air gap is formed between the stator and the rotor, and a distance is formed between the linear hall components and the rotor, wherein the distance is 0.01 mm to 1 mm greater than the length of the air gap.

23. An angle detecting module for a motor rotor disposed on permanent-magnet synchronous motor, the angle detecting module comprising:

a magnetic disk disposed on the permanent-magnet synchronous motor and rotated along with the permanent-magnet synchronous motor rotor; and a detecting device disposed on the permanent-magnet synchronous motor relative to the magnetic disk, the detecting device comprising:

three linear hall components spaced by electrical 120 degrees, the linear hail components measuring a magnetic field position of the motor rotor of the permanent-magnet synchronous motor and outputting an analog signal, each of the analog signals has magnetically saturated third harmonic component; and a processing component electrically connected to the linear hall components, the processing component optimizing each of the analog signals and generating an average rotor angle.

24. The angle detecting module of claim 23, further comprising:

an output component connected to the processing component for outputting the average rotor angle to an external device;

an outer box disposed on the permanent-magnet synchronous motor for installing the magnetic disk and the detecting device, and enabling the angle detecting module to be detachable; and a connecting axis disposed through the outer box for connecting the permanent-magnet synchronous motor and the magnetic disk, thereby enabling the permanent-magnet synchronous motor to rotate the magnetic disk.

25. The angle detecting module of claim 23, wherein a phase shift between the analog signals of the linear hall components is 120 degrees.

26. The angle detecting module of claim 23, wherein a distance is formed between the linear hall components and the magnetic disk, and each of the analog signals has a fundamental frequency component. The magnetically saturated third harmonic component of each of the analog signals due to the distance is 5% to 40% of the fundamental frequency component.

27. The angle detecting module of claim 23, wherein the processing component further comprises an optimizer, and the optimizer optimizes each analog signal and generates an average rotor angle.

28. The angle detecting module of claim 27, wherein the optimizer comprises:

a filter eliminating the magnetically saturated third harmonic component and outputting a relative analog signal;

a converting unit converting the relative analog signal and outputting a rotor angle; and an averaging unit receiving the rotor angle and outputting an average rotor angle.

* * * * *